United States Patent [19]

Franc

[11] Patent Number: 5,007,674
[45] Date of Patent: Apr. 16, 1991

[54] INFANT SHADE APPARATUS

[76] Inventor: John Franc, 129 Schley Ave., Pittsburgh, County of Allegheny, Pa. 15205

[21] Appl. No.: 61,476

[22] Filed: Jun. 15, 1987

[51] Int. Cl.⁵ .............................................. A47C 7/62
[52] U.S. Cl. ..................................... 297/184; 297/487; 5/414
[58] Field of Search .................. 297/184, 250, 487; 5/97, 121, 414, 416, 418; 135/104, 119, 117, 900

[56] References Cited

U.S. PATENT DOCUMENTS

| | | | |
|---|---|---|---|
| 1,887,108 | 11/1932 | Steese | 5/414 |
| 2,757,390 | 8/1956 | Miller | 5/416 |
| 3,713,695 | 1/1973 | Von Wimmersperg | 297/487 X |
| 4,027,915 | 6/1977 | Anderson et al. | 297/184 |
| 4,030,748 | 6/1977 | Brock | 297/184 |
| 4,311,339 | 1/1982 | Heath | 297/487 |
| 4,506,689 | 3/1985 | Fiddler | 297/184 X |
| 4,542,057 | 9/1985 | Breitscheidel et al. | 5/120 X |
| 4,579,385 | 4/1986 | Koenig | 297/184 |
| 4,583,779 | 4/1986 | Myers | 297/184 |
| 4,583,780 | 4/1986 | Finn | 297/184 |

FOREIGN PATENT DOCUMENTS

| | | | |
|---|---|---|---|
| 148441 | 1/1937 | Austria | 297/184 |
| 861749 | 2/1941 | France | 5/416 |

Primary Examiner—Laurie K. Cranmer
Attorney, Agent, or Firm—Carothers & Carothers

[57] ABSTRACT

An apparatus adapted for use in conjunction with an infant car seat or similar device to provide a sun shade for an infant, the novel apparatus being of soft and flexible construction and being self-supporting and free of rigid structural components.

12 Claims, 1 Drawing Sheet

INFANT SHADE APPARATUS

BACKGROUND OF THE INVENTION

In the art of infant conveyances such as car seats, strollers, carriages and the like, it is well known to provide sun shades and other protective covers of various sorts for the purpose of shielding an infant from the elements. Some such devices have contemplated protection of the infant from the rays of the sun while others are intended for protection from wind, rain, cold temperatures or a combination of some or all of these.

The prior art is replete with examples of such devices. For example, U.S. Pat. No. 4,579,385 discloses an inflatable infant seat adaptable sun shade and protective cushion which relys upon the pressure of air developed therein upon inflation to provide structural support for the shade apparatus over an infant seat.

U.S. Pat. Nos. 4,072,345, 4,583,779 and 4,293,162 all disclose sunshades of various sorts for infant carriers and the like. In these patents, the shade apparatus is made from flexible material and is supported by a rigid structural frame. In particular, U.S. Pat. No. 4,583,779 discloses a shade which includes straps and ties by which the shade is suppended with respect to surrounding structures, and U.S. Pat. No. 4,293,162 discloses a shade of flexible fabric that is supported on a cantilevered rigid structural frame.

U.S. Pat. No. 4,314,727 discloses a weather guard in the form of a transparent bubble which is adapted to be attached to a child's car seat. Although it does not contemplate a rigid structural frame, the weather guard itself is fabricated from rigid material, specifically transparent shatter-proof plastic material.

U.S. Pat. Nos. 4,583,780, 4,027,915 and 4,030,748 disclose sun shields or shades which conform generally to a bowed or arched configuration, and all apparently being fabricated from flexible, transparent or tinted plastic.

In spite of prior effort in the art as above characterized, there remains a need for an infant sun shade apparatus offering enhanced safely and durability, greater adaptability to a variety of infant car seat configurations, simplicity of manufacture, low cost, ease of maintenance including launderability, as well as other qualities.

BRIEF SUMMARY OF THE INVENTION

The present invention contemplates such an improved sun shade apparatus in the form of an expanse sheet-form foam rubber which is enclosed within fabric envelope and is provided with a stitched construction which permits the invention to be self-supporting in a lightly tensioned bowed or arched configuration such that its opposite edges may be secured to respective opposite sides of an infant car seat or the like, as by hook and loop pile fasteners, to provide enhanced sun shading for an infant. The apparatus of this invention may be manufactured quite readily with inexpensive equipment and at very low cost. The invention is used without resort to potentially dangerous rigid structural members or relatively rigid shade material such as employed by the structures disclosed in some of the above-cited patents. The novel shade also provides effective sun shading for an infant without obstruction of ventilation.

The invention is fabricated of soft and flexible material to further enhance safety, and is readily cleaned as by washing thereof in standard home laundry equipment. Furthermore, the invention is durable and compact, specifically in that when not in use it may be folded flat and the loop and hook pile fastners used to support the shade with respect to an infant car seat may be used to retain the shade when not in use in a compact bundle that may be stowed readily in a tote bag, infant supply bag, or auto seat back pocket.

It is therefore one object of this invention to provide a novel and improved sun shade apparatus.

It is a more specific object of the invention to provide a novel sun shade apparatus and structure which is self supporting in an arched or bowed configuration to shade an infant without resort to any rigid structural members whatsoever.

A still further object of the invention is to provide such a sun shade as above characterized constructed entirely of soft and resilient materials.

These and other objects and further advantages of the invention will be more readily appreciated upon consideration of the following detailed description and the accompanying drawings, in which.

Figure 1:
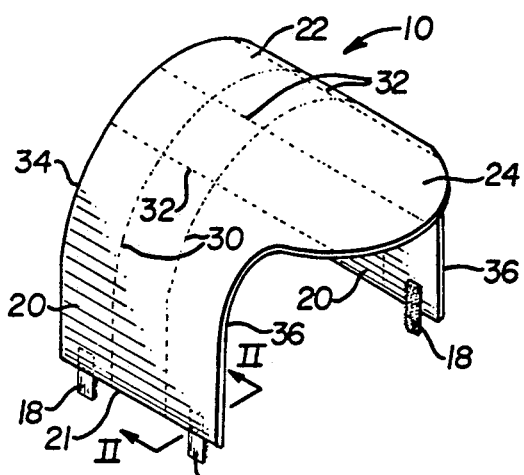
FIG. 1 is a perspective view of an infant shade apparatus according to one presently preferred embodiment of the instant invention.

There is generally indicated at 10 FIG. 1 an infant shade apparatus constructed according to one presently preferred embodiment of the instant invention and comprising an expanse of core material such as sheet-form foam rubber (FIG. 2) which is enclosed in a fabric covering or envelope 14.

When in use, the shade 10 is attached to an infant's car seat 16 or the like (FIG. 4) as by cooperably positioned retention means or fasteners 18, for example, hook and loop pile fasteners such as Velcro brand fastener pads.

Figure 3:
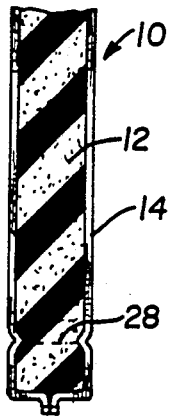
FIG. 3 is a sectional view similar to FIG. 1 which illustrates an alternative mode of perimeter stitching for use in assembly of the illustrated apparatus.
Figure 4:
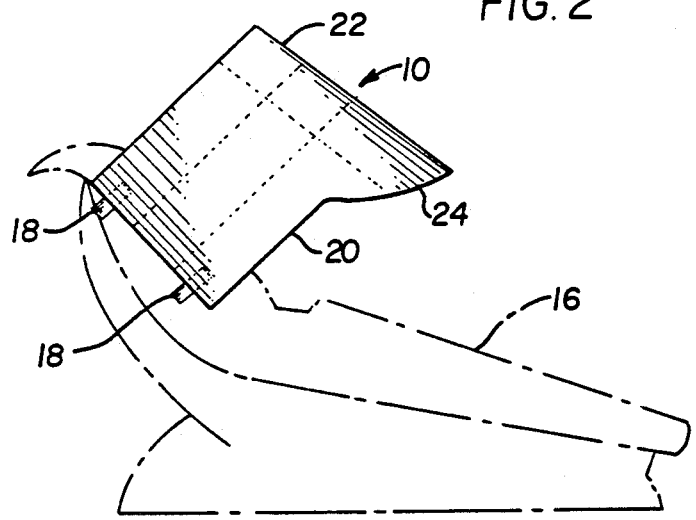
FIG. 4 is a side elevation of the apparatus of FIG. 1 shown installed on an infant car seat.
Figure 5:
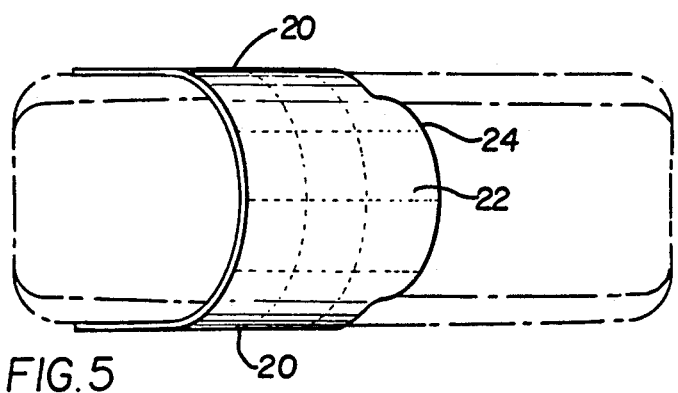
FIG. 5 is a top plan view of the apparatus of the FIG. 4.

When installed in such configuration, the shade 10 forms a self supporting arched or bowed configuration as shown in FIGS. 1, 4 and 5 which is defined by side panel portions 20 which are contiguous with a generally arched top portion 22. A visor portion 24 is formed integrally with at least top portion 22 and preferably also with upper portions of the side panels 20, and extends forwardly therefrom to provide a further sun shading function. The side panel portions 20, top portion 22 and visor portion 24 preferably are formed from a single expanse of sheet-form foam rubber 12 which is cut to the desired shape and enclosed in fabric covering 14, preferably by means of stitched construction or similar attachment means which secures the fabric envelope to the foam rubber core at spaced points along the length of an extended line. Specfically, perimeter stitching such as shown at 26 in FIG. 2 or at 28 FIG. 3 is employed to secure fabric covering 14 to the foam rubber core 12. In addition, the preferred structure of shade 10 calls for longitudinal and lateral stitch extending across the length and breadth of the structure to provide reinforcement and structural integrity which permits the shade to assume and maintain the arched configuration as illustrated without collapsing, and without any tendency for the fabric covering 14 to separate from foam rubber core 12. Without the longitudinal and lateral stitch lines, the fabric covering 14 would not be constrained to follow the formed contour of the foam rubber core 12 when flexed into the arched configuration as shown.

Reinforcing stitch lines may thus be provided such as at 30 and 32. Preferably, a pair of stitch lines 30 extend laterally in the direction of the arched configuration from side to side, both of the stitch lines 30 preferably being set in from the adjacent forward and rear edges of the shade 10. In one preferred mode, for example, one stitch line 30 is spaced 3½ inches from the rear edge 34 of shade 10 and the other is spaced 7 inches from edge 34, with forward edge 36 and visor 24 projecting still further beyond the forwordmost of the two stitch lines 30. Likewise, the front-to-back stitch lines 32 may comprise a plurality of three stitch lines, one generally centered with respect to top portion 22 and the other two stitch lines 32 being spaced equidistantly to either side to the centered stitch line 32.

Of course, a variety of other stitch line patterns may be utilized to provide the requisite self-supporting structure for shade 10. For example, a stitch line running across visor portion 24 and generally connecting the forward edge portions 36 might be utilized to provide a visor structure which may be readily deployed to a use position as shown in the figures to act as an extended shade, or which alternatively may be folded back to overlie the top of portion 22 in a non-use configuration to provide an enlarged field of vision for the infant.

Figure 2:
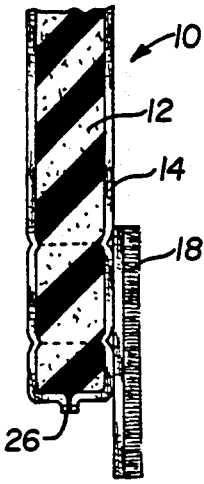
FIG. 2 is a fragmentary section taken on line II—II of FIG. 1.

As shown in FIG. 2, loop and hook pile fasteners 18 preferably are secured to shade 10 by through stitching that passes through the fastener pads 18 as well as through the foam rubber core 12 and both layers of fabric 14 to securely retain fastener pads 18 with respect to the shade structure. As shown, the pads 18 extend below the bottom edge 21 of shade 10 to provide extended tabs for improved ease of attachment and detachment on car seat 16.

It will be noted that the stitched construction not only accords a desireable degree of structural integrity and permits the shade to assume the desired arched configuration in self supporting fashion, the stitch lines also provide convenient fold lines along which the shade 10 may be folded to conveniently lie flat for storage thereof in a seat back pocket or the like when not in use.

Of course it will be self evident from the above disclosure and the figures that shade 10 affords not only sun shading capability, but by virtue of its open front and back it forms a tunnel structure which provides effective shading without restricting ventilation to the infant in any way.

In addition, the disclosed shade structure accords not only very safe sun shading capability due to its soft self-supporting structure, the shading capability is superior to other known shades owing to the materials of construction utilized. The multiple layers of fabric and foam rubber provide ample dead air space, which is the essence of effective heat insulation. Thus, shade 10 not only shields the infant from direct exposure to the sun's rays, but also minimizes radiant heat of the sun impinging on the exterior of the shade. Also due to the structural materials employed, the shade is readily cleaned by washing thereof in home laundry equipment, and fabric envelope 14 may be provided with an attractive pattern by selection of a patterned fabric to attact the attention of the infant and thereby amuse and entertain during auto travel.

In accordance with the description hereinabove, there is provided by the instant invention a novel and improved sun shade apparatus for use in conjunction with a child or infant conveyance such as a car seat, and which accords improved and enhanced safety, convenience, and effectiveness of sun shading for such an infant. Of course, various alternative and modified embodiments apart from those above described have been envisioned and anticipated, and surely such would also occur to others versed in the art once apprised of the invention hereinabove disclosed. Accordingly, it is intended that the invention be construed broadly and limited only by the scope of the claims appended hereto.

I claim:

1. A sun shade for use in conjunction with an infant carrier such as a car seat to shield an infant from the elements comprising:

an expanse of resiliently flexible sheet-form foam rubber;

an envelope of sheet-form material substantially completely covering said expanse of foam rubber;

plural elongated attachment means extending along juxtaposed surface portions of said expanse of foam rubber and said envelope to secure said envelope and said foam rubber together at least at intervals along the extent of each said attachment means;

said elongated attachment means being cooperable with said expanse of foam rubber and said envelope to permit said shade to be formed as a self-supporting arched structure having a pair of spaced apart base portions and a continuously arched body extending over the space between said base portions; and selectively releasable means affixed to said shade adjacent said base portions for co-action with such a carrier to retain said shade with respect to such a carrier as such a self-supporting arched structure.

2. The sun shade as claimed in claim 1 wherein said elongated attachment means includes plural lines of multiple point attachments which secure opposite sides of said envelope together through said expanse of foam rubber.

3. The sunshade as claimed in claim 2 wherein said plural lines include at least a first plurality of multiple point attachment lines extending at laterally spaced location in one direction across said shade and a second plurality of multiple point attachment lines extending at laterally spaced locations across said shade and crossing said first plurality of multiple point attachment lines.

4. The sun shade as claimed in claim 3 wherein said first and second pluralities of multiple point attachment lines extend generally in mutually perpendicular relationship with respect to each other.

5. The sunshade as claimed in claim 4 wherein one of said first and second pluralities of multiple point attachment lines is a pair of attachment lines and the other is three attachment lines.

6. The sunshade as claimed in claim 5 additionally including a multiple point attachment line extending adjacent the lateral perimeter of said shade.

7. The sunshade as claimed in claim 6 wherein said plural lines of multiple point attachments are sewn-in-place stitch lines of thread-form material.

8. The sunshade as claimed in claim 7 wherein said envelope is formed of woven fabric.

9. The sunshade as claimed in claim 1 additionally including integral visor means located so as to extend laterally outwardly with respect to the direction of curvature of said arched structure.

10. The sunshade as claimed in claim 9 wherein said visor is adjustable between a deployed position to provide a shading function, and a clear position to provide an enlarged field of vision for an infant shaded by said shade.

11. The sun shade as claimed in claim 1 which is maintained as said self-supporting arched structure when supported only adjacent said base portions.

12. A sun shade for use in conjunction with an infant carrier such as a car seat to shield an infant from the sun comprising;
- an expanse of resiliently flexible sheet-form foam rubber having an innate tendency to assume a flat configuration;
- an envelope of sheet-form material substantially completely convering said foam rubber;
- a plurality of elongated lines of multiple point attachment extending along juxtaposed surface portions of said foam rubber and said envelope to secure said envelope with respect to said foam rubber at least at intervals along the extent of each said line of multiple point attachment;
- said lines of multiple point attachment being cooperable with said expanse of foam rubber and said envelope to permit said shade to be deformed from said flat configuration to a self-supporting arched configuration wherein said shade extends upwardly from laterally spaced base portions of said arch and over the space between said base portions, and
- selectively releasable retention means affixed to said shade adjacent said base portions for co-action with such an infant carrier to retain said shade with respect to such a carrier in said self-supporting arched configuration.

* * * * *